United States Patent
Zhang et al.

(10) Patent No.: US 10,993,243 B1
(45) Date of Patent: Apr. 27, 2021

(54) SYSTEMS AND METHODS FOR UPLINK POWER CONTROL AND RATE ADAPTATION WITHIN A WIRELESS LOCAL AREA NETWORK (WLAN)

(71) Applicant: Marvell International Ltd., Hamilton (BM)

(72) Inventors: Yan Zhang, Palo Alto, CA (US); Xiayu Zheng, San Jose, CA (US); Bo Yu, San Jose, CA (US); Jinjing Jiang, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/570,360

(22) Filed: Sep. 13, 2019

Related U.S. Application Data (60) Provisional application No. 62/730,955, filed on Sep. 13, 2018.

(51) Int. Cl.
| | |
|---|---|
| *H04W 72/08* | (2009.01) |
| *H04W 72/04* | (2009.01) |
| *H04W 52/24* | (2009.01) |
| *H04B 17/318* | (2015.01) |
| *H04W 52/14* | (2009.01) |
| *H04W 52/38* | (2009.01) |
| *H04W 52/26* | (2009.01) |

(52) U.S. Cl.
CPC ........ *H04W 72/082* (2013.01); *H04B 17/318* (2015.01); *H04W 52/146* (2013.01); *H04W 52/241* (2013.01); *H04W 52/262* (2013.01); *H04W 52/383* (2013.01); *H04W 72/042* (2013.01); *H04W 72/0446* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 2005/0221829 A1* | 10/2005 | Nishida | G01S 11/06 455/440 |
| 2009/0010234 A1* | 1/2009 | Li | H04L 45/125 370/338 |
| 2010/0136996 A1* | 6/2010 | Han | H04W 24/02 455/452.1 |
| 2012/0220248 A1* | 8/2012 | Kanda | H04W 48/16 455/150.1 |
| 2020/0037337 A1* | 1/2020 | Patwardhan | H04W 52/367 |

* cited by examiner

*Primary Examiner* — Anh Ngoc M Nguyen (57) ABSTRACT

A method for communicating in a wireless local area network is disclosed herein. The AP sets an uplink target received signal strength information (RSSI) for all participating stations (STAs) and transmits the information to the STAs in a trigger frame. Specifically, the AP sets the uplink target RSSIs for each STA to be within a predetermined range of each other so that when the STAs transmit respective uplink frames, those frames are received at the AP at the set uplink target RSSI.

20 Claims, 4 Drawing Sheets

SYSTEMS AND METHODS FOR UPLINK POWER CONTROL AND RATE ADAPTATION WITHIN A WIRELESS LOCAL AREA NETWORK (WLAN)

CROSS-REFERENCE TO RELATED APPLICATION

This disclosure claims the benefit of U.S. Provisional Patent Application No. 62/730,955, filed Sep. 13, 2018, which is hereby incorporated by reference in its entirety.

FIELD OF USE

This disclosure relates to techniques and methods for uplink power control during concurrent transmissions from multiple stations to an access point in a wireless data transmission system. For example, the system may include a wireless local area network (WLAN) implementing an IEEE 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Wireless local area networks (WLANs) includes a central access point (AP) coupled to a number of client stations (STA) over a wireless interface and typically operate in either a unicast mode or a multicast mode. In the unicast mode, the AP transmits information to one client station at a time. In the multicast mode, the same information, such as a packet, is transmitted and concurrently received by two or more client stations. Development of WLAN standards such as the Institute for Electrical and Electronics Engineers (IEEE) 802.11ac and 802.11ax standards has improved data throughput, for example, by allowing transmissions and receptions of independent data streams over the same radio frequencies. In such implementations, a group of client stations can share the same bandwidth for data transmission/reception.

Efficient use of resources of a wireless local area network (WLAN) is important in order to provide bandwidth and acceptable response times to the users of the WLAN. However, when multiple stations (STAs) transmit data packets to an access point (AP) at the same time, the WLAN system performance may suffer due to interference at neighboring receivers of the AP that receive the concurrent transmissions. This interference is further exaggerated when there are large differences in the received power of the various transmissions, thus resulting in a poor reception at the AP.

SUMMARY

Embodiments described herein provide a method for communicating in a wireless local area network (WLAN). The method includes setting, at the AP, an uplink target received signal strength information (RSSI) for each of the plurality of STAs, wherein the uplink target RSSI for each STA is set to be within a predetermined range relative to the uplink target RSSIs for the other STAs. The method further includes transmitting, from the AP to each of the plurality of STAs, a respective trigger frame containing an assigned modulation and coding scheme (MCS) and the uplink target RSSI for the assigned MCS. The AP further receives respective uplink frames transmitted to the AP by each respective STA such that the uplink frames are received by the AP at a respective one of the assigned uplink target RSSIs included in the respective trigger frame. Specifically, the AP includes an uplink target receive RSSI in the trigger frame. Each participating STAs transmits their respective packets to the AP at a transmit power so that those packets are received by the AP at the set target uplink RSSI.

The method for communicating in a WLAN further includes, when determining the uplink target RSSI for each of the plurality of STAs, determining, at the AP, a maximum tolerable uplink RSSI based on the selected MCS; calculating, at the AP, a sum of the uplink target RSSIs for each of the STAs; determining whether the sum of the uplink target RSSIs for each of the STAs is greater than the maximum tolerable uplink RSSI; and in response to determining that the sum of the uplink target RSSIs for each of the STAs is greater than the maximum tolerable uplink RSSI, reducing the uplink target RSSIs for each of the STAs.

The method for communicating in a WLAN further includes, when determining the uplink target RSSI for each of the plurality of STAs, calculating, by the AP, a per tone uplink target RSSI for each of the STAs such that a difference between a maximum per tone uplink target RSSI and a minimum per tone uplink target RSSI is less than a predetermined value.

The method for communicating in a WLAN further includes, when determining the uplink target RSSI for each of the plurality of STAs, for each STA transmitting an uplink frame to the AP for a first time, measuring an RSSI from a previous single-user (SU) transmission to the AP; reducing a predetermined STA headroom from the measured RSSI; and setting the uplink target RSSI for the STA to be equal to the reduced RSSI.

The method for communicating in a WLAN further includes, when determining the uplink target RSSI for each of the plurality of STAs, for each STA transmitting an uplink frame to the AP after previously transmitting an uplink frame, determining whether a packet error rate (PER) for the previous transmission by the STA is higher than a target PER for the rate of transmission; in response to determining that the PER for the previous transmission by the STA is higher than a target PER for the rate of transmission, increasing the uplink target RSSI value from the previous transmission based on the reported headroom for the assigned MCS from the STA in the uplink frame.

The method for communicating in a WLAN further includes, when determining the uplink target RSSI for each of the plurality of STAs, for each STA transmitting an uplink frame to the AP after previously transmitting an uplink frame, determining whether a packet error rate (PER) for the previous transmission by the STA is lower than a target PER for the rate of transmission and the STA is transmitting at a peak rate; in response to determining that the PER for the previous transmission by the STA is lower than a target PER for the rate of transmission and the STA is operating at the peak rate, reducing the uplink target RSSI value from the previous transmission based on a difference between the target PER and the PER for the previous transmission.

The method for communicating in a WLAN further includes, when calculating, by the AP, the per tone uplink target RSSI for each of the STAs such that a difference between a maximum per tone uplink target RSSI and a minimum per tone uplink target RSSI is less than a predetermined value, setting an initial per tone uplink target RSSI for each of the STAs; calculating a difference between each STA per tone uplink target RSSI and a minimum per tone uplink target RSSI; and adjusting each scheduled per tone uplink target RSSI to be within a predetermined range from the minimum per tone uplink target RSSI.

The method for communicating in a WLAN further includes, when reducing the uplink target RSSIs for each of the STAs, calculating a difference between the total sum of the uplink target RSSIs for each of the STAs and the maximum tolerable uplink RSSI; and adjusting the uplink target RSSI for each of the STAs based on the calculated difference.

The method for communicating in a WLAN where the trigger frame further includes an uplink rate selection based on an effective signal to noise ratio (SNR) of an assigned resource unit (RU) or an effective SNR of an assigned spatial stream.

The method for communicating in a WLAN where the effective SNR is determined based on STA PER statistics, STA SU transmission rates, and a difference between the uplink target RSSI and an uplink RSSI for a previous transmission.

Embodiments are also described herein for a wireless system for communicating in a wireless local area network (WLAN). The system includes an AP comprising control circuitry configured to set an uplink target received signal strength information (RSSI) for each of the plurality of STAs, wherein the uplink target RSSI for each STA is set to be within a predetermined range relative to the uplink target RSSIs for the other STAs, transmit, via a transmitter to each of the plurality of STAs, a respective trigger frame containing an assigned modulation and coding scheme (MCS) and the uplink target RSSI for the assigned MCS, and receiving, by a receiver, a respective uplink frame from each of the STAs at the assigned uplink target RSSI included in the received trigger frame.

Embodiments are also described herein for a method for communicating within a wireless local area network (WLAN). The method includes receiving a trigger frame at a station having uplink frames to be transmitted to an access point (AP). The STA extracts, from the received trigger frame, a modulation and coding scheme (MCS) indicative of a rate of transmission and a target uplink received signal strength information (RSSI) indicative of a required receive power at the AP for the uplink frame. The method further includes transmitting the uplink frames to the AP at a power level such that the frames are received at the AP at the uplink target RSSI.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for uplink power control for a plurality of client stations (STAs) within an 802.11ax wireless network. More particularly, in a multi-user (MU) system, where multiple stations (STAs) are scheduled to transmit data packets to an access point (AP) via MU multiple-input multiple-output (MU-MIMO) or MU orthogonal frequency-division multiple access (MU-OFDMA), the AP needs to maintain uplink power control to avoid excessive interference among the various transmissions. As noted above, when there is a large power difference between the different transmissions received at the AP concurrently, the resulting interference causes a higher packet error rate (PER), particularly for transmission arriving at a low receive power.

Methods and systems described here provide for a communicating within a wireless local area network (WLAN) where uplink frames are received by the AP at an uplink target power specified by the AP. Specifically, high efficiency (HE) uplink transmissions, including MU-MIMO and MU-OFDMA, are sent via HE Trigger Based (TB) Physical layer convergence protocol (PLCP) protocol data unit (PPDU). Since multiple transmitters from the various STAs take part in an HE TB PPDU transmission, uplink power control is necessary to control interference between HE TB PPDU transmissions from participating STAs.

Figure 1:
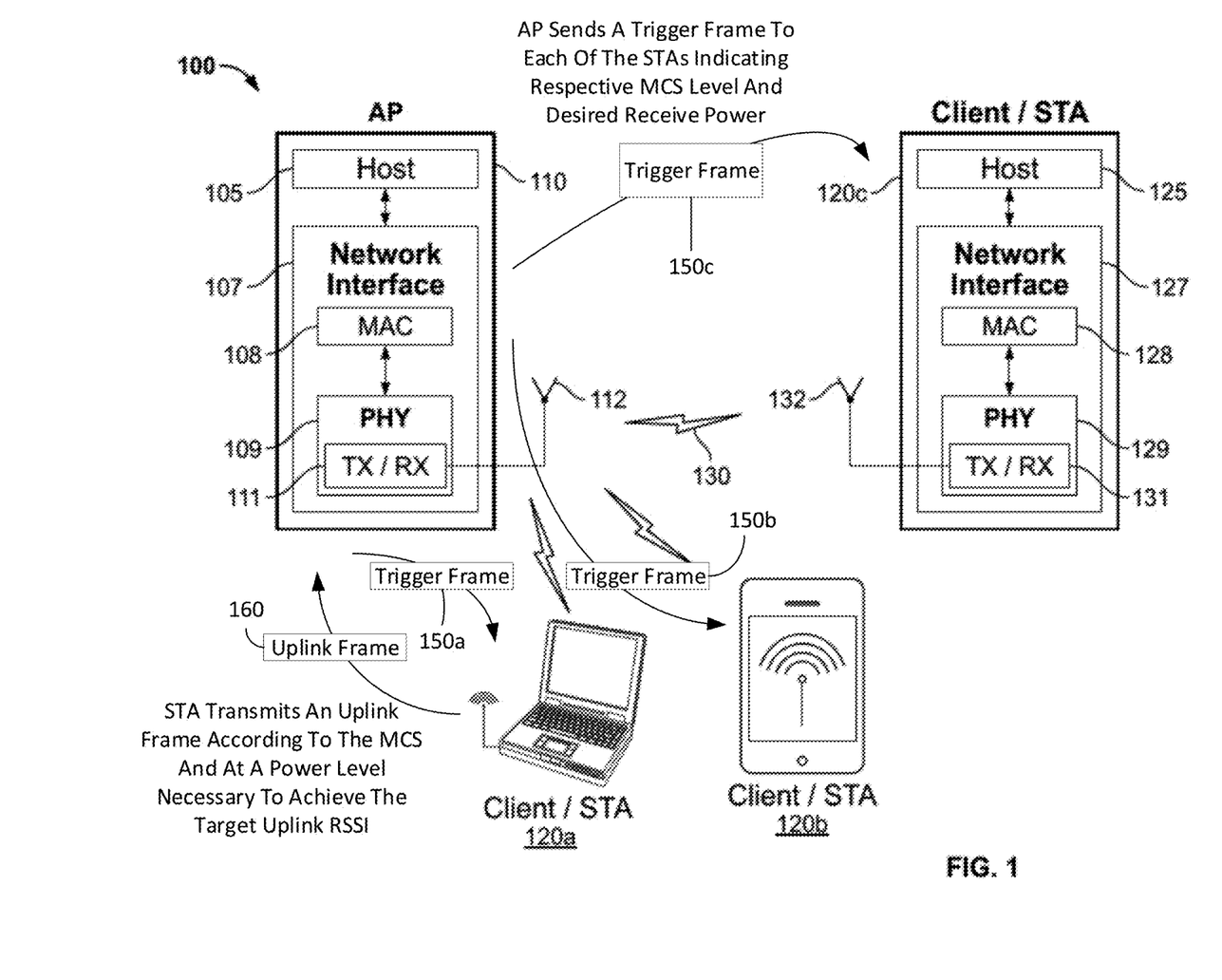
FIG. 1 is a block diagram of an example wireless WLAN 100 in which the AP schedules a plurality of STAs for transmission, according to some embodiments described herein.

FIG. 1 is a block diagram of an example wireless WLAN 100 that the uplink power control system can be operated within, according to some embodiments described herein. A wireless AP 110 (access point) includes a host processor 105 (host control circuitry) that may be configured to process or assist in data operation, such as modulation/demodulation, encoding/decoding, encryption/decryption, or the like. For example, the host processor 105 of an AP, in accordance with an implementation, is configured to calculate uplink target power for each of the client stations 120a-c and send that information as part of trigger frame.

A network interface circuitry 107 is coupled to the host processor 105, which is configured to interface with a plurality of client stations. The network interface circuitry 107 includes a medium access control (MAC) processing unit 108 and a physical layer (PHY) processing unit 109. The PHY processing unit 109 includes a plurality of transceivers 111, and the transceivers 111 are coupled to a plurality of antennas 112 (for simplicity only one is shown).

The WLAN 100 includes a plurality of client stations 120a-c. Although three client stations 120a-c are illustrated in FIG. 1, the WLAN 100 can include different numbers (e.g., 1, 2, 3, 5, 6, etc.) of client stations 120a-c in various scenarios and embodiments. Each client station, e.g., 120a-c, may have a similar structure as that of an AP 110 (access point). For example, the client station 120c seen in FIG. 1 includes a host processor 125 (host control circuitry) coupled to a network interface circuitry 127. The network interface circuitry 127 includes a MAC processing unit 128 and a PHY processing unit 129. The PHY processing unit 129 includes a plurality of transceivers 131, and the transceivers 131 are coupled to a plurality of antennas 132 (for simplicity only one is shown) to receive or transmit data from or to the wireless communication channel.

Two or more of the client stations 120*a-c* may be configured to receive data such as including an 802.11 data frame 130, which may be transmitted concurrently by the AP 110 (access point) to the two or more client stations 120*a-c*. Additionally, two or more of the client stations 120*a-c* can be configured to transmit data back to the AP 110 (access point) such that the AP 110 receives the data. When two or more STAs transmit respective uplink frames concurrently to the AP 110 in an implementation, the AP maintains uplink power control over the client stations 120*a-c* in order to minimize interference among the data frames that it receives.

Figure 2:
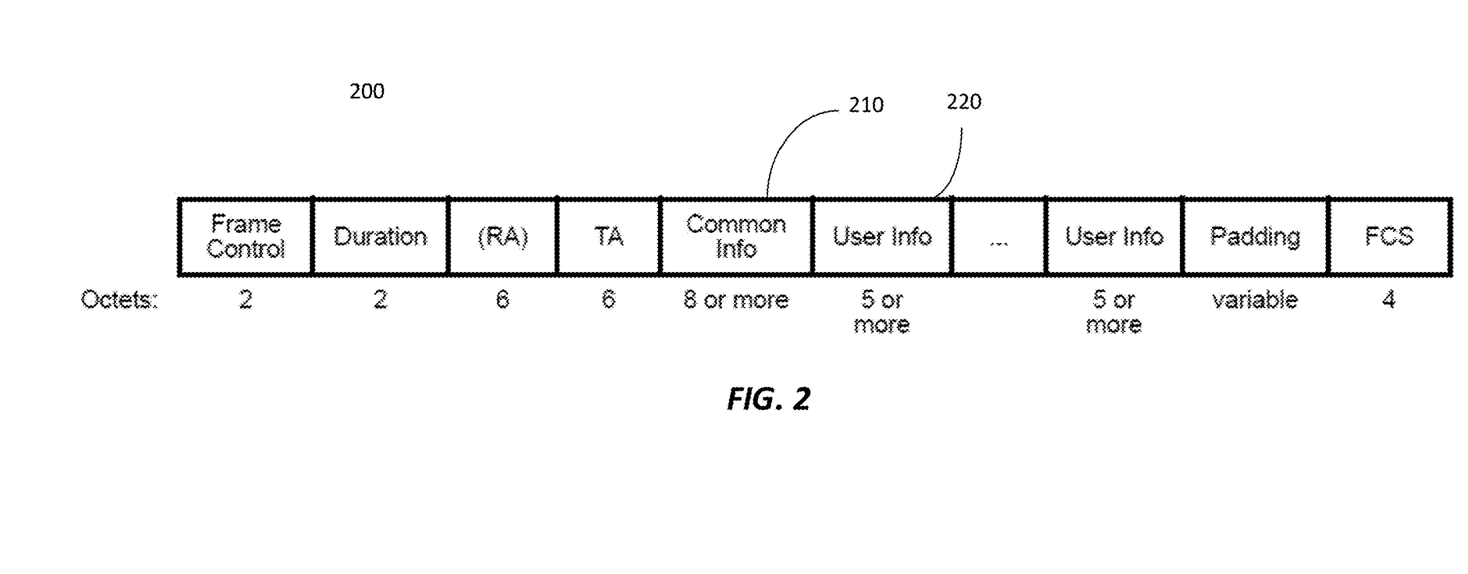
FIG. 2 is a block diagram of an example trigger frame, according to some embodiments described herein.

In some implementations, the AP 110 determines a resource unit (RU) allocation, spatial stream allocation, a modulation and coding scheme (MCS), and an uplink target received signal strength information (RSSI) of the MCS for each STA in the HE TB PPDU transmission. The AP 110 sends a trigger frame (such as trigger frames 150*a-c*) to each of the STAs before the STAs send their respective HE TB PPDU transmissions. FIG. 2 is a block diagram of an example trigger frame 200 multicasted by the AP to participating STAs in an embodiment. As seen in FIG. 2, the trigger frame 200 includes a common information field 210 and a user information field 220. In an embodiment, the AP 110 includes information targets for uplink power control and transmission rate adaptation in the common information field 210 and the user information field 220.

For uplink (UL) OFDMA, the AP 110 allocates the available resource units (RUs) comprising one or more tones to different participating STAs. The RU allocation is performed over the bandwidth for different STAs based on finding the STA which has a maximum average signal to noise ratio (SNR) in the RU, in accordance with one embodiment. Similarly, for MU-MIMO, the spatial stream (SS) allocation is conducted based on the MIMO grouping which is formed by finding the users with minimum channel correlation between them. In some implementations, the AP selects the MCS for each STA separately based on RU allocation per STA for UL-OFDMA and based on spatial stream allocation per STA for UL MU-MIMO. It is noted that the MCS selection is affected by both the channel variations across time and also per STA power control via UL target RSSI set in the trigger frame 200.

For a given MCS level, if the received uplink target RSSI, $UL_{RSSI}$, exceeds a predetermined value, the AP receiver performance will degrade due to saturation. In some embodiments, this maximum tolerable UL RSSI threshold (i.e., the predetermined value) depends on the modulation and coding scheme (MCS) level. Specifically, the threshold is lower for higher MCS levels (e.g., MCS 11) and is higher for lower MCS levels (e.g., MCS 1). That is, at higher MCS levels (i.e., higher transmission rates), the AP tolerates a lower RSSI threshold at the receivers. The received UL RSSI at AP side is the sum of UL RSSI of all participating STAs which may transmit at different MCS levels. Therefore, the maximum tolerable UL RSSI is bounded by STA with the highest MCS in some embodiments (i.e., at MCS 11, the maximum tolerable UL RSSI will be the lowest value). The AP 110, in some implementations, therefore stores the maximum tolerable RSSI values for each MCS to be able to correctly set UL target RSSI value for STAs scheduled for transmission. More particularly, the AP 110 sets the UL target RSSI values such that the STAs transmit frames at a power level necessary for the AP to receive the frames at the set UL target RSSI. For example, in some implementations, the AP checks if the sum of the Target RSSI exceeds the maximum tolerable RSSI value corresponding to the highest assigned MCS in the UL transmission.

In some implementations, to simplify implementation, the AP 110, stores only the maximum tolerable RSSI value for the highest level MCS supported by 802.11ax (i.e., MCS 11) as the threshold to correctly set UL Target RSSI for participating STAs.

Moreover, the AP 110 ensures that the UL target RSSI for each of the STAs is within a permissible range. Specifically, based on simulation evaluations, the AP 110 maintains a difference of UL received per tone signal to noise ratio (SNR) among scheduled STAs to be within a few dB range to minimize performance degradation due to fixed point precision. In some implementations, UL per tone Target RSSI values is used as the approximate UL per tone SNR values in implementation, i.e., $$\max_{i \in S_{UL}} (UL^i_{perTone\_Target\_RSSI}) - \min_{i \in S_{UL}} (UL^i_{perTone\_Target\_RSSI}) \le \alpha$$

where $S_{UL}$ is the set of scheduled STAs, and $\alpha$ is an empirical parameter obtained either from simulations or lab tests. Therefore, by maintaining the uplink target RSSI to be within a predetermined range, the AP 110 minimizes interference between neighboring receivers at the AP.

Figure 3:
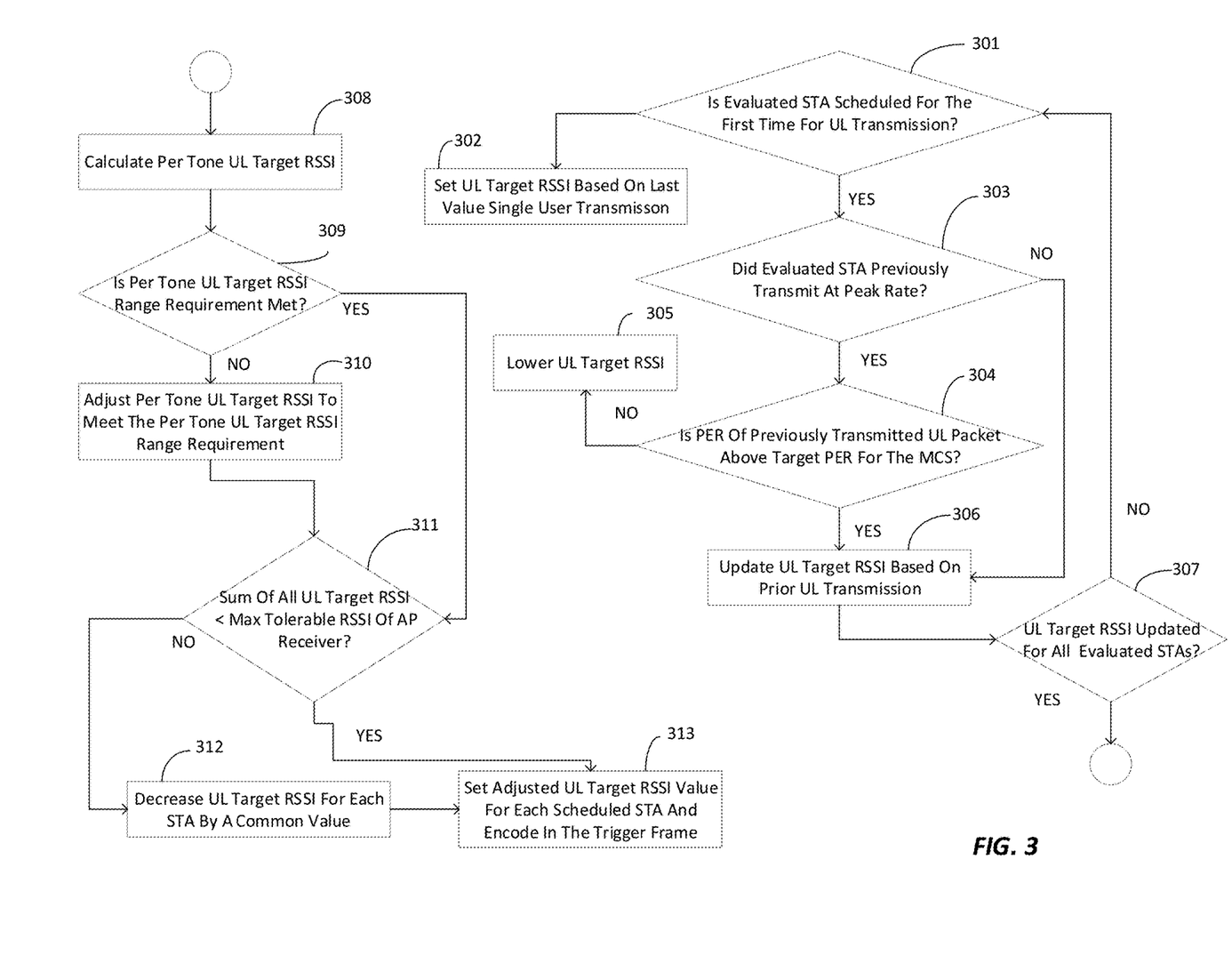
FIG. 3 is an example flow diagram illustrating an example method for uplink power control, according to some embodiments described herein.

FIG. 3 is an example flow diagram illustrating an example method for uplink power control, according to some embodiments described herein. At 301, the AP 110 determines whether the STA being evaluated (e.g., STA 120*a*) is being scheduled for uplink transmission for a first time. If, at 301, it is determined that the STA being evaluated is being scheduled for uplink transmission for the first time, the method moves to 302 where the AP 110 sets the uplink target RSSI based on the last valid single user (SU) transmission. Specifically, the AP 110 sets the UL target RSSI to be the UL RSSI measured from the last valid SU transmission minus a margin $\eta$.

$$UL_{Target\_RSSI}^u(1) = UL_{RSSI}^u - \eta \qquad (1)$$

where $UL_{RSSI}^u$ is the UL RSSI measured from last valid SU transmission from STA u, and $\eta$ is an empirical value obtained from lab tests, which is used to ensure that STA headroom reported in the HE TB PPDU is greater than 0. The STA then transmits the HE TB PPDU at a power level necessary for the HE TB PPDU to be received at the UL target RSSI.

If, on the other hand, it is determined at 301 that the STA being evaluated is not being scheduled for uplink transmission for the first time, the method moves to 303 where the AP 110 determines whether the STA being evaluated transmitted at a peak transmission rate during the prior uplink transmission. If it is determined that the STA being evaluated transmitted at peak transmission rates, the method moves to 304 where the AP 110 determines whether the packet error rate (PER) for the previous uplink transmission was higher than the target PER based on the MCS. If at 304, it is determined the PER for the previous uplink transmission was lower than the target PER (determined based on the MCS), the method moves to 305, and the AP 110 reduces the uplink target RSSI while maintaining the same transmission rates.

If, on the other hand, it is determined the PER for the previous uplink transmission was higher than the target PER (determined based on the MCS), the method proceeds to 306 where the AP 110 updates the UL target RSSI for a STA u as seen in equation (2) below assuming MCS k is the assigned MCS for STA u:

$$UL_{Target\_RSSI}^{u}(n+1) = UL_{Target\_RSSI}^{u}(n) + HR_{STA}^{u,k} - \eta \quad (2)$$

where $UL_{Target\_RSSI}^{u}(n)$ s the UL Target RSSI at nth scheduling instance for STA u, $HR_{STA}^{u,k}$ is the headroom for MCS k reported from STA u via HE TB PPDU, and r is the same value as described in equation (1) above.

Next, at 307, the AP 110 determines whether all participating STAs have been evaluated. If not, the AP 110 repeats steps 301-306 until all STAs have been evaluated. Once all STAs have been evaluated (YES at 307), the method moves to 308 where the AP calculates a per tone UL target RSSI. Specifically, due to the fact that STA effective SNR in UL OFDMA transmission is also affected by size of the allocated RU, the AP 110 calculates per tone UL Target RSSI. The AP 110 calculates the per tone UL Target RSSI after initial UL Target RSSI is set for all scheduled STAs, using equation (3) below:

$$UL_{perTone\_Target\_RSSI}^{u}(n) = UL_{Target\_RSSI}^{u}(n) - 10\log 10(Num_u^{Tone}(n)) \quad (3)$$

where n is the scheduling instance index for STA u, $Num_u^{Tone}(n)$ is the number of tones of the assigned RU for STA u at the nth scheduling instance. It is noted that for UL MU-MIMO scheduling, $Num_u^{Tone}(n)$ is the number of the tones within the entire transmission bandwidth.

Once the per tone UL target RSSI is calculated, the AP 110 determines whether a difference between a maximum per tone UL target RSSI and a minimum per tone target UL RSSI is below a threshold at 309. Specifically, the AP 110 checks whether a per tone UL target RSSI range requirement is met using the following equation (4):

$$\max_{i \in S_{UL}} (UL_{perTone\_Target\_RSSI}^{i}(n)) - \min_{i \in S_{UL}} (UL_{perTone\_Target\_RSSI}^{i}(n)) \leq \alpha \quad (4)$$

If, at 309, the AP 110 determines that the per tone UL target RSSI range requirement is not met, the method proceeds to 310 and the UL target RSSI is adjusted. Specifically, the AP 110 calculates the difference between each STA per tone Target RSSI and lowest STA per tone Target RSSI using equation (5-a) below and adjusts each scheduled STA UL Target RSSI using equation (5-b) below.

$$\Delta UL_{perTone\_Target\_RSSI}^{u}(n) = \quad (5a)$$
$$UL_{perTone\_Target\_RSSI}^{u}(n) - \min_{i \in S_{UL}} (UL_{perTone\_Target\_RSSI}^{i}(n))$$

$$UL_{Target\_RSSI}^{u}(n) = \begin{cases} \min_{i \in S_{UL}} (UL_{perTone\_Target\_RSSI}^{i}(n)) + \alpha + 10\log 10(Num_u^{Tone}(n)) & \Delta UL_{Target\_RSSI}^{u}(n) > \alpha \quad (5b) \\ UL_{perTone\_Target\_RSSI}^{u}(n) + 10\log 10(Num_u^{Tone}(n)) & \Delta UL_{Target\_RSSI}^{u}(n) \leq \alpha. \end{cases}$$

The AP 110 thus ensures that the per tone UL target RSSI range requirement is met.

If, on the other hand, the per tone UL target RSSI range requirement is met at 309, the method proceeds to 311. At 311, the AP 110 checks whether the sum of the UL target RSSI of all scheduled STAs are below a maximum tolerable RSSI threshold, $UL_{RSSI}^{Max}$, set by the AP 110. Specifically, the AP 110, at 312, calculates the additional power above the threshold using the equation (6):

$$\Delta P = \quad (6)$$
$$\max\left(0, 10*\log 10\left(\sum_{u \in S_{UL}} \text{power}(10, 0.1*UL_{Target\_RSSI}^{u}(n))\right) - UL_{RSSI}^{Max}\right)$$

The AP 110 then adjusts the UL target RSSI for each scheduled STA using equation (7) below and, at 313, sets the adjusted UL target RSSI as the final UL Target RSSI transmitted in the Trigger frame User info field.

$$UL_{Target\_RSSI}^{u}(n) = [UL_{Target\_RSSI}^{u}(n) - \Delta P] \quad (7)$$

In some embodiments, the $UL_{Target\_RSSI}^{u}(n)$ is coded by 7 bits in the unit 1 dBm, which covers the range of [−110, −20] dBM. The STAs, upon receiving the trigger frame 200 from the AP 110, extract the UL target RSSI from the user information field 220 within the trigger frame 200, and begin transmitting data packets on the scheduled tones at the scheduled uplink target RSSI.

Figure 4:
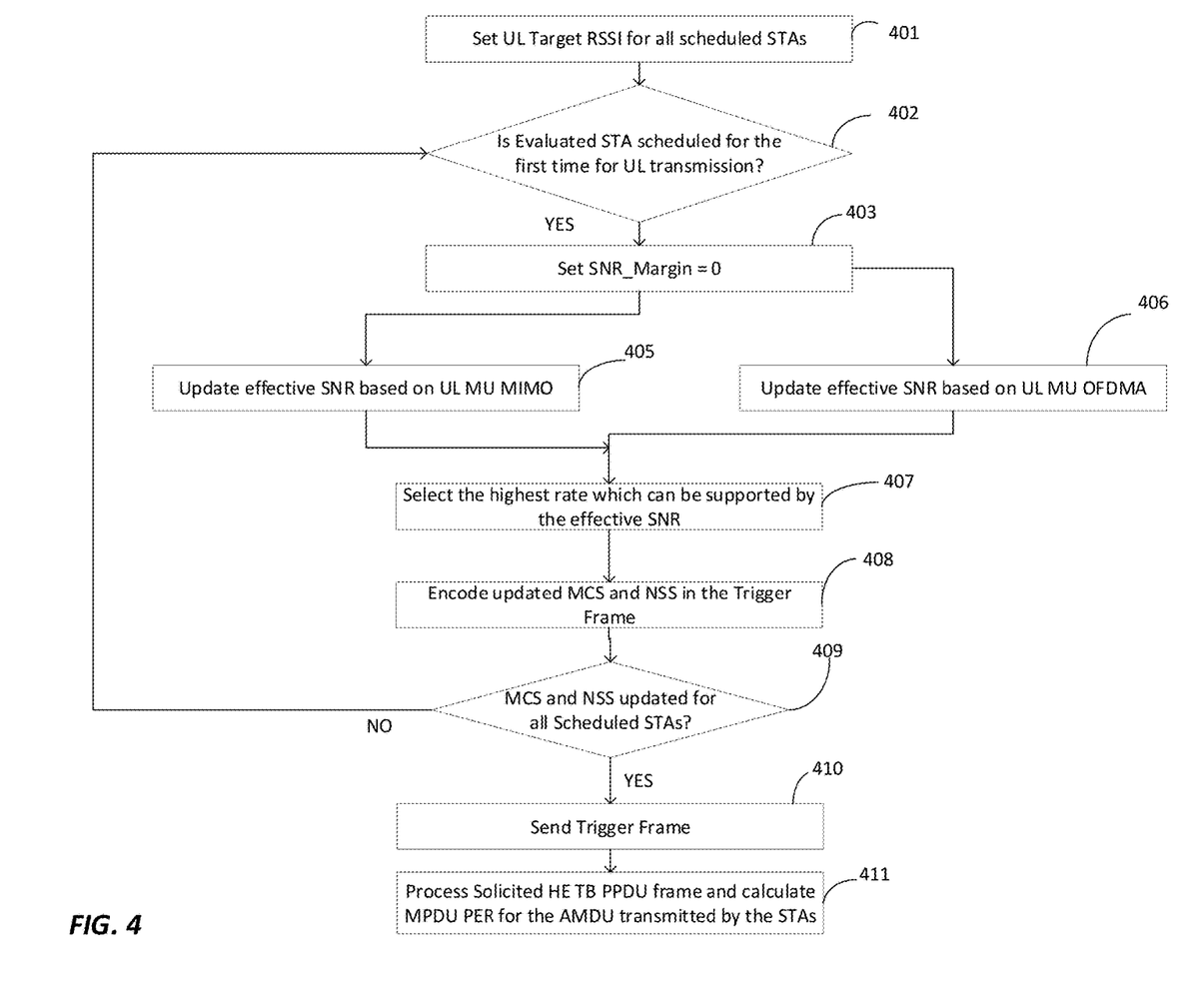
FIG. 4 is an example flow diagram illustrating an example method for uplink multi-user (MU) rate adaptation, according to some embodiments described herein.

FIG. 4 is an example flow diagram illustrating an example method for uplink multi-user (MU) rate adaptation, according to some embodiments described herein. Once the AP 110 sets the UL target RSSI for each of the scheduled STAs at 401, the AP begins the process of UL rate adaptation. UL Rate adaptation is done by the AP 100 via setting an MCS and a number of spatial streams in the trigger frame. In some embodiments, the AP refers to a rate adaptation table, such as Table (1) below.

TABLE (1)

| Rate (Mbps) | Nss | MCS | Uplink Rx Sensitivity(dB) | Rx Sensitivity difference between neighboring rates (dB) |
|---|---|---|---|---|
| 365.63 | 3 | 11 | −54 | 5 |
| 329.06 | 3 | 10 | −59 | 5 |
| 292.50 | 3 | 9 | −64 | 3 |
| 263.25 | 3 | 8 | −67 | 3 |
| 219.38 | 3 | 7 | −70 | 3 |
| 197.44 | 3 | 6 | −72 | 2 |
| 175.50 | 3 | 5 | −74 | 2 |
| ... | | | | ... |

In some implementations, the AP 110 selects the appropriate rate for a scheduled STA based on effective SNR of assigned RU for UL OFDMA transmission, or effective SNR of the assigned spatial streams for UL MU-MIMO transmission.

The effective SNR for a scheduled UL STA can be represented by a function of the STA PER statistics, $PER_{MPDU}$, STA SU transmission rate, $SU\_rate_{UL}^{u}$, STA TX power difference, $UL_{Target\_RSSI}^{u} - UL_{RSSI}^{u}$, due to UL power control, and other SNR offsets, $\delta$, depending on OFDMA or MUMIMO modes. Specially, the effective SNR for a scheduled UL STA can be represented as:

$$SNR\_eff_u = f(SU\_rate_{UL}^{u}, PER_{MPDU}, UL_{Target\_RSSI}^{u}, UL_{RSSI}^{u}, \delta)$$

For each scheduled STA, the AP 110 finds the highest rate in a SNR-rate table (stored at the AP) which can be supported by the effective SNR of the STA and assigns it to the STA for the next UL transmission.

In some embodiments, the AP 110 maintains a SNR-rate table which maps nominal SNRs (relative SNR value in dB corresponding to PER 10% Rx sensitivities of the rates compared to the that of the lowest rate) to different rates. The nominal SNRs may be generated by simulations in some embodiments.

If STA u is scheduled in UL transmission for the first time (YES at 402), the effective SNR margin is set to 0 at 403 (i.e., $SNR_{margin}^u = 0$) In some implementations involving UL MU-MIMO transmission (405), the AP 110 takes interference from co-scheduled STAs into account in the effective SNR calculation. Specifically, once the UL target RSSI is set, the AP 110 approximates the effective SNR using equation (8):

$$SNR\_eff_u = SNR\_nominal(SU\_rate_{UL}^u) - SNR_{margin}^u - \delta + (UL_{Target\_RSSI}^u - UL_{RSSI}^u) \quad (8)$$

where $UL_{Target\_RSSI}^u$ is the UL Target RSSI for STA u, encoded in Trigger frame user info field for STA u, and $UL_{RSSI}^u$ is the UL RSSI measured from last valid SU transmission with rate from STA u to AP. The STA transmitter power difference due to UL power control is reflected in $UL_{Target\_RSSI}^u - UL_{RSSI}^u$. $\delta$ is a predetermined offset to approximate the interference from co-scheduled STAs, which can be obtained via simulations. $SNR\_nominal(SU\_rate_{UL}^u)$ maps the SU transmission rate to a nominal SNR from the SNR-rate table. $SNR_{margin}^u$ is a function of STA PER statistics as described in more details below.

In some implementations involving UL OFDMA transmission (406), the rate selection is done after UL Target RSSI is set for all scheduled STAs. The AP 110 calculates the effective SNR for STA u on the ith RU using equation (9):

$$SNR\_eff_u^i = \\ SNR\_nominal(SU\_rate_{UL}^u) - SNR_{margin}^u + f\left(\bigcup_{n \in T_i} H_{u,i,n}, \bigcup_{n \in T_{BW}} H_u\right) + \\ 10\log 10\left(\frac{Num_{BW}^{Tone}}{Num_i^{Tone}}\right) + (UL_{Target\_RSSI}^u - UL_{RSSI}^u) \quad (9)$$

The power boost effect from transmitting in an RU instead of entire bandwidth is reflected in $$10\log 10\left(\frac{Num_{BW}^{Tone}}{Num_i^{Tone}}\right).$$

The channel difference between entire bandwidth and one assigned RU is reflected in function $$f\left(\bigcup_{n \in T_i} H_{u,i,n}, \bigcup_{n \in T_{BW}} H_u\right),$$

where $H_{u,n}$ is the UL CSI of the evaluated tone n in $T_{BW}$, and $T_{BW}$ is the set of evaluated tones for the entire bandwidth; and $H_{u,i,n}$ is the UL CSI of evaluated tone n in $T_i$, and $T_i$ is the set of evaluated tones inside the ith RU. One specific example of $$f\left(\bigcup_{n \in T_i} H_{u,i,n}, \bigcup_{n \in T_{BW}} H_u\right)$$

can be written as:

$$f\left(\bigcup_{n \in T_i} H_{u,i,n}, \bigcup_{n \in T_{BW}} H_{u,n}\right) = 10\log 10\left[\frac{\sum_{n \in T_i} \text{Trace}(H_{u,i,n} H'_{u,i,n})|T_{BW}|}{\sum_{n \in T_{BW}} \text{Trace}(H_{u,n} H'_{u,n})|T_i|}\right]$$

The AP 110 then maps the effective SNR to the highest rate which can be supported in the SNR-rate table at 407, as the initial rate for STA u in the next UL MU-MIMO transmission, $R_u$, as shown in equation (10):

$$R_u = \max_{Rate}(SNR\_nominal(Rate) < SNR\_eff_u) \quad (10)$$

At 408, the AP 110 encodes the updated MCS and NSS in the corresponding User information field MCS and NSS subfields of the trigger frame. Once the MCS and NSS are updated for all scheduled STAs (YES at 409), the AP 110 sends the trigger frames to all scheduled STAs. At 410, the AP 110 processes the solicited HE TB PPDU, calculates the MPDU PER for the AMPDU transmitted by each STA, and adjusts the SNR margin.

Specifically, in some embodiments, the initial effective SNR value used for rate selection may not be sufficiently accurate for UL transmission. The AP 110 therefore does SNR adjustment based on PER statistics which is reflected in the definition of SNR margin. The goal is to achieve target PER for the assigned rate. Specifically, for each STA transmitting a MPDU in OFDMA or MU-MIMO mode, SNR margin is updated when PER is updated (e.g., after receiver decoding finishes for UL transmission). The AP 110 adjusts the SNR margin for STA u after MPDU PER is updated. Specifically, the AP 110 calculates the MPDU error rate of the last AMPDU for STA u:

$$PER_{MPDU}^u = \frac{N_{MPDU}^{error}}{N_{MPDU}} \quad (11)$$

where $N_{MPDU}$ is the total number of MPDUs in the AMPDU, and $N_{MPDU}^{error}$ is the number of MDPUs that are not correctly received. The AP 110 then updates the SNR margin for STA u:

$$SNR_{margin}^u = SNR_{margin}^u + \frac{PER_{MPDU}^u - PER_{Target}(k)}{1 - PER_{Target}(k)} \cdot A_{Step}(k) \quad (12)$$

where $PER_{Target}(k)$ is the Target PER for rate k.

The SNR margin adjustment, $\Delta SNR_{margin}^u$, is stored for UL power control if STA current rate is the peak rate and its PER is lower than Target PER, $PER_{target}(k)$.

$$\Delta SNR_{margin}^u = \frac{|PER_{MPDU}^u - PER_{Target}(k)|}{1 - PER_{Target}(k)} \cdot A_{Step}(k) \quad (13)$$

It is noted that the exact values of $A_{step}(k)$ depends on how fast the AP wants to achieve target PER and how much PER fluctuation can be tolerated. It can be optimized through lab tests in some embodiments.

While this specification contains many specifics, these are not to be construed as limitations on the scope of what may be claimed, but, rather, as descriptions of particular implementations of the subject matter.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for communicating in a wireless local area network (WLAN) comprising:
   setting, at the AP, an uplink target received signal strength information (RSSI) for each of the plurality of STAs, wherein the uplink target RSSI for each STA is set to be within a predetermined range relative to the uplink target RSSIs for the other STAs;
   transmitting, from the AP to each of the plurality of STAs, a respective trigger frame containing an assigned modulation and coding scheme (MCS) and the uplink target RSSI for the assigned MCS; and
   receiving, at the AP, a respective uplink frame transmitted to the AP by each respective STA at a respective one of the determined uplink target RSSIs included in the respective trigger frame.

2. The method for communicating in a WLAN according to claim 1, wherein determining the uplink target RSSI for each of the plurality of STAs comprises:
   determining, at the AP, a maximum tolerable uplink RSSI based on the selected MCS;
   calculating, at the AP, a sum of the uplink target RSSIs for each of the STAs;
   determining whether the sum of the uplink target RSSIs for each of the STAs is greater than the maximum tolerable uplink RSSI; and
   in response to determining that the sum of the uplink target RSSIs for each of the STAs is greater than the maximum tolerable uplink RSSI, reducing the uplink target RSSIs for each of the STAs.

3. The method for communicating in a WLAN according to claim 1, wherein determining the uplink target RSSI for each of the plurality of STAs comprises:
   calculating, by the AP, a per tone uplink target RSSI for each of the STAs such that a difference between a maximum per tone uplink target RSSI and a minimum per tone uplink target RSSI is less than a predetermined value.

4. The method for communicating in a WLAN according to claim 1, wherein determining the uplink target RSSI for each of the plurality of STAs comprises:
   for each uplink frame received by the AP from a STA transmitting for a first time:
   measuring an RSSI from a previous single-user (SU) transmission to the AP;
   reducing a predetermined STA headroom from the measured RSSI; and
   setting the uplink target RSSI for the STA to be equal to the reduced RSSI.

5. The method for communicating in a WLAN according to claim 1, wherein determining the uplink target RSSI for each of the plurality of STAs comprises:
   for each an uplink frame received by the AP from a STA transmitting after previously transmitting another uplink frame:
   determining whether a packet error rate (PER) for the previous transmission by the STA is higher than a target PER for the rate of transmission; and
   in response to determining that the PER for the previous transmission by the STA is higher than a target PER for the rate of transmission:
   increasing the uplink target RSSI value from the previous transmission based on the assigned MCS for the STA.

6. The method for communicating in a WLAN according to claim 1, wherein determining the uplink target RSSI for each of the plurality of STAs comprises:
   for each uplink frame received by the AP from a STA transmitting after previously transmitting another uplink frame:
   determining whether a packet error rate (PER) for the previous transmission by the STA is lower than a target PER for the rate of transmission; and
   in response to determining that the PER for the previous transmission by the STA is lower than a target PER for the rate of transmission:
   reducing the uplink target RSSI value from the previous transmission based on a difference between the target PER and the PER for the previous transmission.

7. The method for communicating in a WLAN according to claim 3, wherein calculating, by the AP, the per tone uplink target RSSI for each of the STAs such that a difference between a maximum per tone uplink target RSSI and a minimum per tone uplink target RSSI is less than a predetermined value, further comprises:
   setting an initial per tone uplink target RSSI for each of the STAs;
   calculating a difference between each STA per tone uplink target RSSI and a minimum per tone uplink target RSSI; and
   adjusting each scheduled per tone uplink target RSSI to be within a predetermined range from the minimum per tone uplink target RSSI.

8. The method for communicating in a WLAN according to claim 2, wherein reducing the uplink target RSSIs for each of the STAs further comprises:
   calculating a difference between the total sum of the uplink target RSSIs for each of the STAs and the maximum tolerable uplink RSSI; and
   adjusting the uplink target RSSI for each of the STAs based on the calculated difference.

9. The method for communicating in a WLAN according to claim 1, further comprising:
   including an uplink rate selection based on an effective signal to noise ratio (SNR) of an assigned resource unit (RU) or an effective SNR of an assigned spatial stream in the respective trigger frames transmitted by the AP.

10. The method for communicating in a WLAN according to claim 9, further comprising:

determining the effective SNR based on STA packet error rate (PER) statistics, STA single user (SU) transmission rates, and a difference between the uplink target RSSI and an uplink RSSI for a previous transmission.

11. A system for communicating in a wireless local area network (WLAN) comprising:
an access point (AP) comprising control circuitry configured to:
set an uplink target received signal strength information (RSSI) for each of the plurality of STAs, wherein the uplink target RSSI for each STA is set to be within a predetermined range relative to the uplink target RSSIs for the other STAs;
transmit, via a transmitter to each of the plurality of STAs, a respective trigger frame containing an assigned modulation and coding scheme (MCS) and the uplink target RSSI for the assigned MCS; and
receiving, by a receiver, a respective uplink frame from each of the STAs at the assigned uplink target RSSI included in the received trigger frame.

12. The system for communicating in a WLAN according to claim 11, wherein the control circuitry, when determining the uplink target RSSI for each of the plurality of STAs, is further configured to:
determine a maximum tolerable uplink RSSI based on the selected MCS;
calculate a sum of the uplink target RSSIs for each of the STAs;
determine whether the sum of the uplink target RSSIs for each of the STAs is greater than the maximum tolerable uplink RSSI; and
in response to determining that the sum of the uplink target RSSIs for each of the STAs is greater than the maximum tolerable uplink RSSI, reduce the uplink target RSSIs for each of the STAs.

13. The system for communicating in a WLAN according to claim 11, wherein the control circuitry, when determining the uplink target RSSI for each of the plurality of STAs, is further configured to:
calculate a per tone uplink target RSSI for each of the STAs such that a difference between a maximum per tone uplink target RSSI and a minimum per tone uplink target RSSI is less than a predetermined value.

14. The system for communicating in a WLAN according to claim 11, wherein the control circuitry, when determining the uplink target RSSI for each of the plurality of STAs, is further configured to:
for each uplink frame received by the AP from a STA transmitting for a first time:
measure an RSSI from a previous single-user (SU) transmission to the AP;
reduce a predetermined STA headroom from the measured RSSI; and
set the uplink target RSSI for the STA to be equal to the reduced RSSI.

15. The system for communicating in a WLAN according to claim 11, wherein the control circuitry, when determining the uplink target RSSI for each of the plurality of STAs, is further configured to:
for uplink frame received by the AP from a STA transmitting after previously transmitting another uplink frame:
determine whether a packet error rate (PER) for the previous transmission by the STA is higher than a target PER for the rate of transmission; and
in response to determining that the PER for the previous transmission by the STA is higher than a target PER for the rate of transmission:
increase the uplink target RSSI value from the previous transmission based on the assigned MCS for the STA.

16. The system for communicating in a WLAN according to claim 11, wherein the control circuitry, when determining the uplink target RSSI for each of the plurality of STAs, is further configured to:
for each uplink frame received by the AP from a STA transmitting after previously transmitting another uplink frame:
determine whether a packet error rate (PER) for the previous transmission by the STA is lower than a target PER for the rate of transmission; and
in response to determining that the PER for the previous transmission by the STA is lower than a target PER for the rate of transmission:
reduce the uplink target RSSI value from the previous transmission based on a difference between the target PER and the PER for the previous transmission.

17. The system for communicating in a WLAN according to claim 13, wherein the control circuitry, when calculating, by the AP, the per tone uplink target RSSI for each of the STAs such that a difference between a maximum per tone uplink target RSSI and a minimum per tone uplink target RSSI is less than a predetermined value, is further configured to:
set an initial per tone uplink target RSSI for each of the STAs;
calculate a difference between each STA per tone uplink target RSSI and a minimum per tone uplink target RSSI; and
adjust each scheduled per tone uplink target RSSI to be within a predetermined range from the minimum per tone uplink target RSSI.

18. The system for communicating in a WLAN according to claim 12, wherein the control circuitry, when reducing the uplink target RSSIs for each of the STAs, is further configured to:
calculate a difference between the total sum of the uplink target RSSIs for each of the STAs and the maximum tolerable uplink RSSI; and
adjust the uplink target RSSI for each of the STAs based on the calculated difference.

19. The system for communicating in a WLAN according to claim 11, wherein control circuitry, when generating the trigger frame, is further configured to:
include an uplink rate selection based on an effective signal to noise ratio (SNR) of an assigned resource unit (RU) or an effective SNR of an assigned spatial stream in the trigger frame transmitted by the AP.

20. The system for communicating in a WLAN according to claim 19, wherein the effective SNR is determined based on STA packet error rate (PER) statistics, STA single user (SU) transmission rates, and a difference between the uplink target RSSI and an uplink RSSI for a previous transmission.

* * * * *